(12) United States Patent
Moore

(10) Patent No.: US 12,374,243 B2
(45) Date of Patent: Jul. 29, 2025

(54) AEROSPACE WARNING TAG

(71) Applicant: REDFAB INC., Coldwater (CA)

(72) Inventor: Michael Moore, Coldwater (CA)

(73) Assignee: REDFAB INC., Orillia (CA)

( * ) Notice: Subject to any disclaimer, the term of this patent is extended or adjusted under 35 U.S.C. 154(b) by 0 days.

(21) Appl. No.: 17/794,075

(22) PCT Filed: Jan. 20, 2021

(86) PCT No.: PCT/CA2021/050053
§ 371 (c)(1),
(2) Date: Jul. 20, 2022

(87) PCT Pub. No.: WO2021/146800
PCT Pub. Date: Jul. 29, 2021

(65) Prior Publication Data
US 2023/0140092 A1    May 4, 2023

Related U.S. Application Data

(60) Provisional application No. 62/963,318, filed on Jan. 20, 2020.

(51) Int. Cl.
*G09F 13/16* (2006.01)
*G09F 21/10* (2006.01)
*G09F 17/00* (2006.01)

(52) U.S. Cl.
CPC .............. *G09F 13/16* (2013.01); *G09F 21/10* (2013.01); *G09F 2017/0075* (2013.01)

(58) Field of Classification Search
CPC ... G09F 13/16; G09F 21/10; G09F 2017/0075
See application file for complete search history.

(56) References Cited

U.S. PATENT DOCUMENTS

| | | | | |
|---|---|---|---|---|
| 2,064,060 | A * | 12/1936 | Frenkel | G09F 13/16 40/615 |
| 3,936,567 | A * | 2/1976 | Vesely | G09F 3/10 428/913 |
| 8,112,922 | B2 * | 2/2012 | Keil | G09F 13/16 40/615 |
| 9,799,236 | B2 * | 10/2017 | Moore | G06K 19/07758 |
| 2014/0104656 | A1 * | 4/2014 | Crisp | G06Q 30/0276 358/1.18 |
| 2022/0227161 | A1 * | 7/2022 | Holcombe | G09F 13/16 |

FOREIGN PATENT DOCUMENTS

| | | | | |
|---|---|---|---|---|
| CA | | 2921447 A1 * | 8/2016 | ....... G06K 19/06028 |
| WO | WO-2014161667 A1 * | | 10/2014 | ............. B41M 3/14 |

* cited by examiner

*Primary Examiner* — Cassandra Davis
(74) *Attorney, Agent, or Firm* — McMillan LLP

(57) ABSTRACT

A warning tag and process of making the warning tag are provided. The warning tag has a substrate layer, a reflective layer laid on top of the substrate layer, and a negatively printed message on the reflective layer. In some embodiments, the reflective layer is covered with non-reflective ink to form the non-reflective ink coating such that a warning indicia message is left exposed while the surrounding area thereto is covered. A process of making such warning tags is also provided.

17 Claims, 8 Drawing Sheets

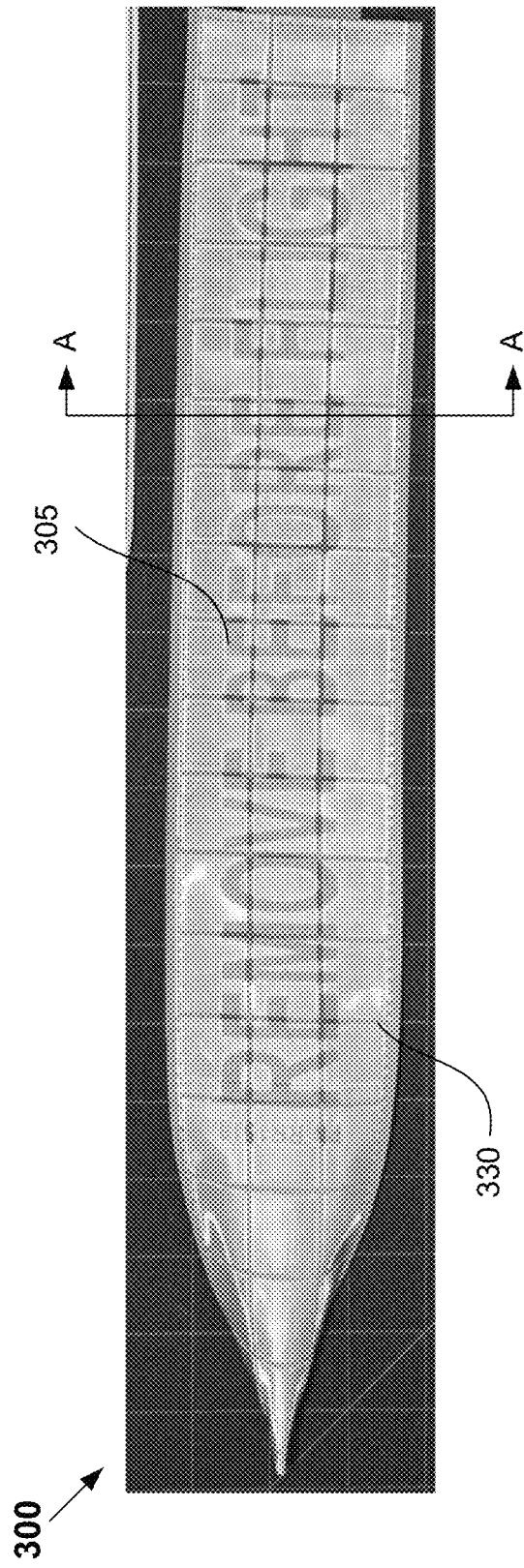
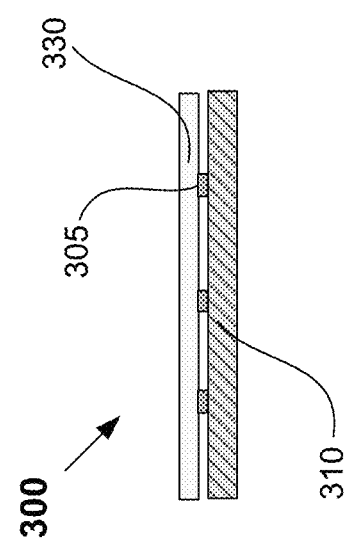
FIG. 2 (Prior Art)
FIG. 3 (Prior Art)

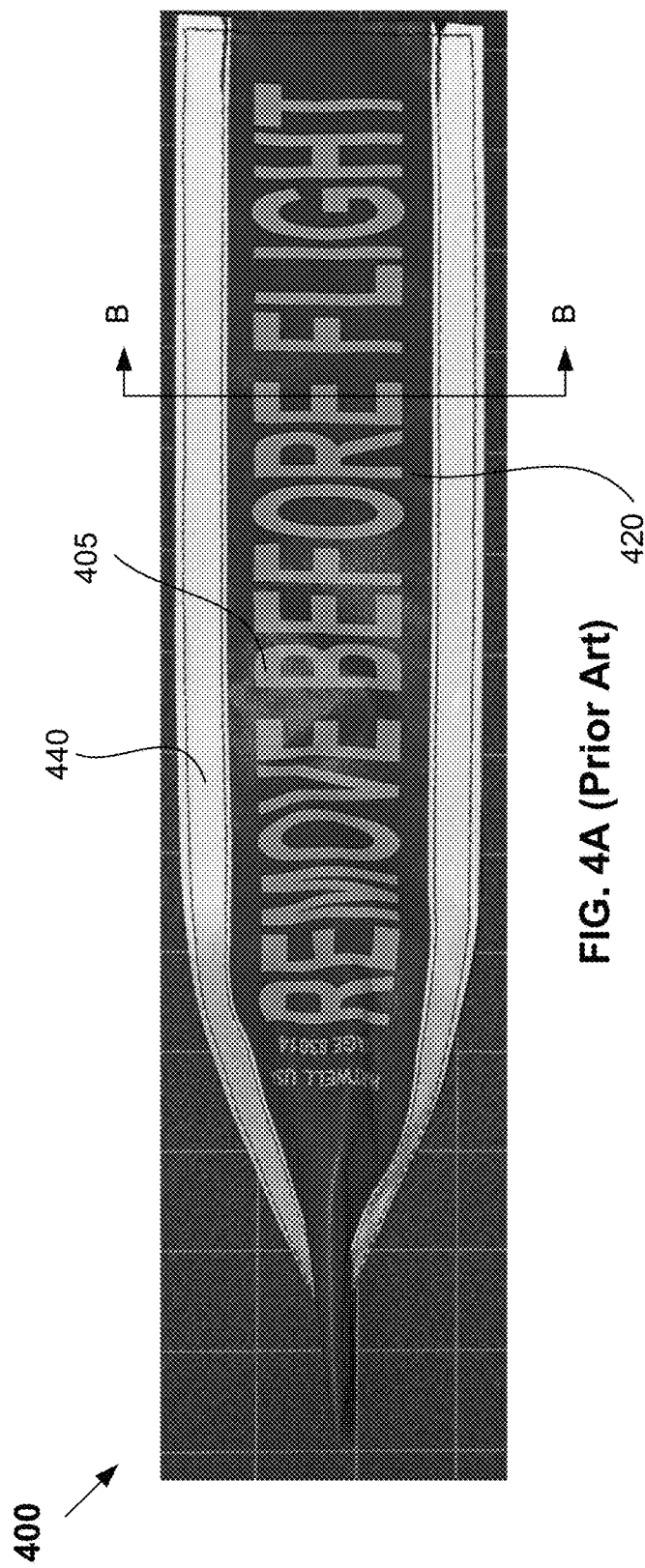
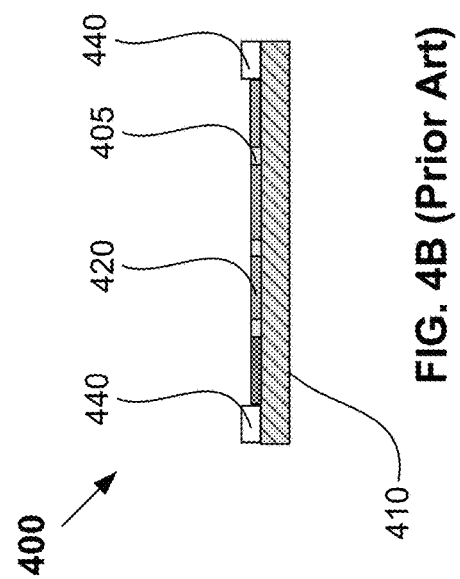
FIG. 4A (Prior Art)
FIG. 4B (Prior Art)

AEROSPACE WARNING TAG

This application claims the benefit of U.S. provisional patent application No. 62/963,318 filed on Jan. 20, 2020, the contents of which are herein incorporated by reference in their entirety.

FIELD OF THE INVENTION

The invention relates generally to the field of warning devices and procedures, and more particularly to an aerospace warning tag.

BACKGROUND OF THE INVENTION

Several countries have lockout/tagout and warning standards for the purposes of preventing injuries and deaths caused by the accidental or untimely start-up of equipment during maintenance or servicing. Portions of these standards deal with proper shutdown or other steps taken to render the machinery inoperative prior to maintenance, energy source management, and user training. In addition, the marking or tagging of machine while it is lined up for servicing or maintenance, or while it is in the midst of such servicing or maintenance forms a part of some of these standards. In any event, even where standards do not exist there are benefits to providing lockout tags or indicia for the tagging or marking of machinery undergoing servicing or maintenance.

One industry in which lockout, warning, and 'remove before flight' tags are used is in the servicing of aircraft, and aircraft ground support equipment. Lockout and tagout tags are intended to be readily and suitably attached to the aircraft, be highly visible, and provide the appropriate indicia to alert a pilot or service technician that an aircraft or service equipment is not fit for flight or service. The level of caution may be presented by the color of the tag. U.S. Pat. No. 9,799,236, the contents of which are herein incorporated by reference in their entirety, discloses a lockout tag.

Warning tags, which comply with the National Aerospace Standard NAS-1756, and NAS-1091 offer a way to improve aerospace safety by standardizing the material and construction of aerospace flags. These flags remind pilots and aircraft maintenance technicians to remove these items before flight. The warning tags must be physically removed prior to flight ensuring that they were seen and accounted for. These flags contain various messages, such as "Remove Before Flight" and can be used as physical reminders of pre-flight checks that must be completed before takeoff.

One challenge in the warning tags is that when the ambient light is dim the text of the warning indicia of the warning tag cannot be viewed clearly. Accordingly, there is a need in the art for an improved warning tag that is easily viewable in the dark and/or in low-light conditions.

SUMMARY

In accordance with one aspect of the present invention there is provided a warning tag having: a substrate layer; a reflective layer laid on top of the substrate layer; and a negatively printed message on the reflective layer.

In some embodiments, the reflective layer is covered with non-reflective ink to form the non-reflective coating such that a warning indicia message is left exposed while the surrounding area thereto is covered.

In accordance with another aspect of the present invention there is provided a process of making a warning tag, the process including: affixing a reflective layer on top of a substrate layer; and negatively printing a warning message on the reflective layer.

In some embodiments, the negative printing of the warning message involves, covering the reflective layer with non-reflective ink to form the non-reflective ink coating such that a warning indicia message is left exposed while the surrounding area thereto is covered.

BRIEF DESCRIPTION OF THE DRAWINGS

Embodiments are now be described, by way of example only, with reference to the attached Figures, wherein:

FIG. 2 is a top plan view of a prior art warning tag in the form of a flag having a microprismatic reflective layer and non-reflective lettering;

FIG. 3 is a sectional view taken at line A-A of FIG. 2;

FIG. 4A is a top plan view of a prior art warning tag in the form of a flag having reflective edge strips and non-reflective lettering;

FIG. 4B is a sectional view taken at line B-B of FIG. 4A;

DESCRIPTION OF THE EMBODIMENTS

In this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

In this disclosure, the term "ink" may include one or more of: solvent, UV-curable, aqueous and latex inks, dye, paint, stain, pigment, tint, varnish or other colorant that is colorfast and appropriately weather resistant.

In this disclosure, "negative printing" could be achieved with any number of inks, paints and processes for applying them. In particular a wide format inkjet technology may be used.

Figure 1:
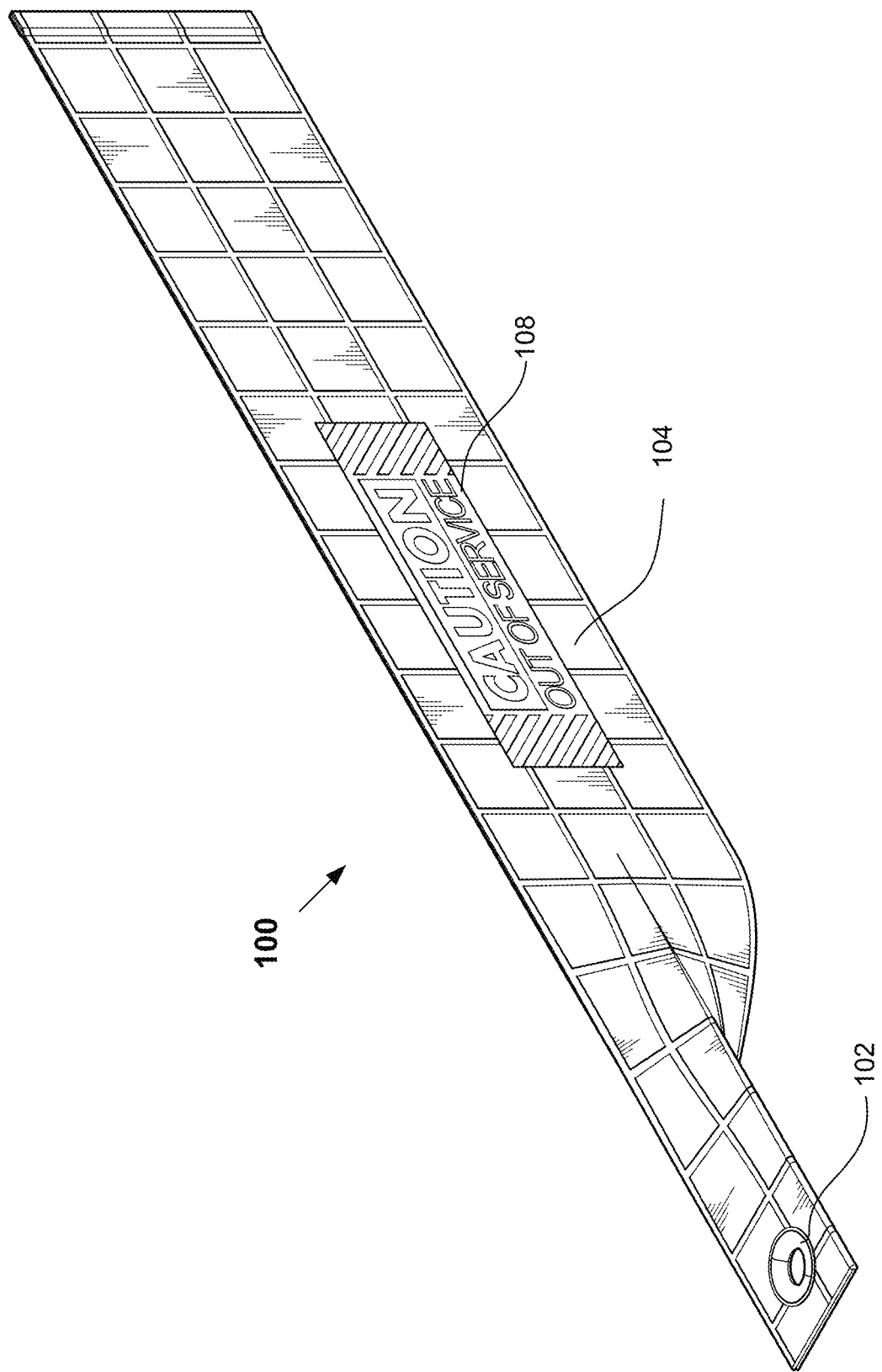
FIG. 1 is a perspective view of a prior art lockout tag in the form of a "CAUTION" flag.

FIG. 1 shows a prior art lockout tag in the form of a flag 100 as disclosed in U.S. Pat. No. 9,799,236. The flag 100 is generally elongate in shape and is approximately 45 cm long and 8 cm wide. The flag 100 comprises a main body 104, a centrally-located warning indicia 108, and a circular eye (or orifice) 102. The warning indicia 108 may state such messages as "Caution—Out of Service", "Danger—Do not Operate", "Remove Before Flight", or any other suitable safety message. The circular eye 102 or oval eye-type connector is for affixing the flag 100 to an aircraft or machinery being subject to lockout/tagout procedures.

The lockout tags, such as the flag 100, may be reflective (retroreflective or otherwise) and fluorescent, such as Reflexite® (Oralite® GP 340 Highlight) produced by Orafol Europe GmbH, and preferably by virtue of a reflective square-shaped pattern, heat sealed or high frequency welded directly into the material in order to improve viewing angle of the tags. The flag may comprise a reflective and fluorescent material on one side or both sides. The reflective durable nature of the tag provides increased visibility during various lighting conditions, from varying viewing angles and in out-door rainy/foggy conditions. Reflective tags are also useful in many areas where machinery are generally stored or maintained, for example in warehouses or manufacturing facilities with low lighting conditions. Reflective tags may also be useful in out-of-the-way, hard to see locations or for elevated energy source lockout locations.

Optionally, a portion or the entirety thereof may be provided in the form of a photo-luminescent surface for particular benefit in low-light, or no-light, environments.

Each of the tags may also be made to conform to lockout/tagout standards, such as the ANSI Z535.2-2011 standard from OSHA standard 1910.147, Control of Hazardous Energy or Lock out/Tag out, which states that "safety signs shall be displayed with illumination or retro-reflectorization as needed for adequate legibility under normal operating conditions. Where illumination is inadequate or colors are not recognizable the use supplemental illumination may be applied.

FIG. 2 and FIG. 3 depict a prior art warning tag in the form of a flag 300. The flag 300 is comprised of a substrate layer 310 on which a such as a warning indicia 305 is printed. A microprismatic diffuser layer 330 is superimposed on top of the substrate layer 310 and the warning indicia 305. The microprismatic diffuser layer 330 glows in low-light conditions. However, if exposed to sunlight for a long period of time, the microprismatic diffuser layer 330 deteriorates and loses its properties. Accordingly, the warning indicia becomes less visible under low light conditions which is undesirable.

FIGS. 4A and 4B depict a prior art warning tag in the form of a flag 400. This design overcomes the problem with the microprismatic diffusion layers deteriorating under sunlight by utilizing reflective strips as described herein. The flag 400 is comprised of a substrate layer 410. In one embodiment, the substrate layer is coated with a background paint 420 of a darker color and warning indicia 405 covered in a lighter colour, as shown. A pair of reflective edge strips 440 are affixed to the substrate layer 410 on the edges thereof to surround the warning indicia 405, as shown. The reflective edge strips may be stitched or glued to the substrate layer, or affixed thereto by other suitable means.

Figure 5:
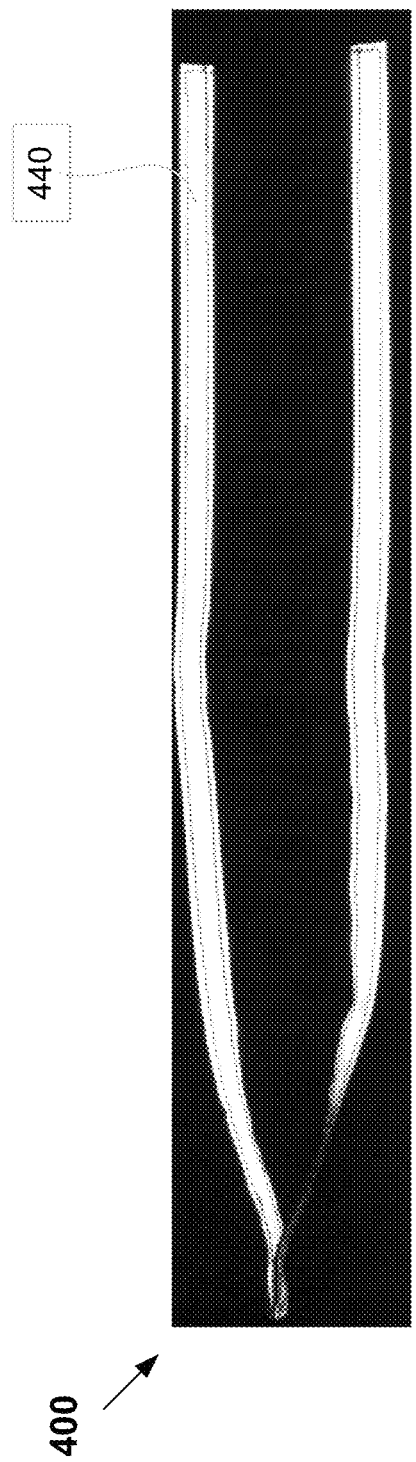
FIG. 5 is a black-and-white top plan view of a prior art warning tag similar to that of FIG. 4A under low-light and a camera flash condition.

FIG. 5 shows a black and white image of the flag 400 under low light conditions and including the use of a camera flash. As shown in FIG. 5, the reflective edge strips 440 are showing indicating that the flag 400 is a warning tag. However, the warning indicia is not showing since it is not made of reflective material like edge strips 440. Accordingly, a user is unable to read the text of the warning indicia which is undesirable.

In order to overcome the shortcoming of the flag 400 of FIGS. 4A-4B and FIG. 5, the warning indicia message may be made from the same reflective material as the reflective edge strips. In one embodiment, the individual letters forming the warning indicia text would be cut from the reflective material, and individually affixed to a substrate layer. This process is labour intensive and costly.

Figures 6A, 6B:
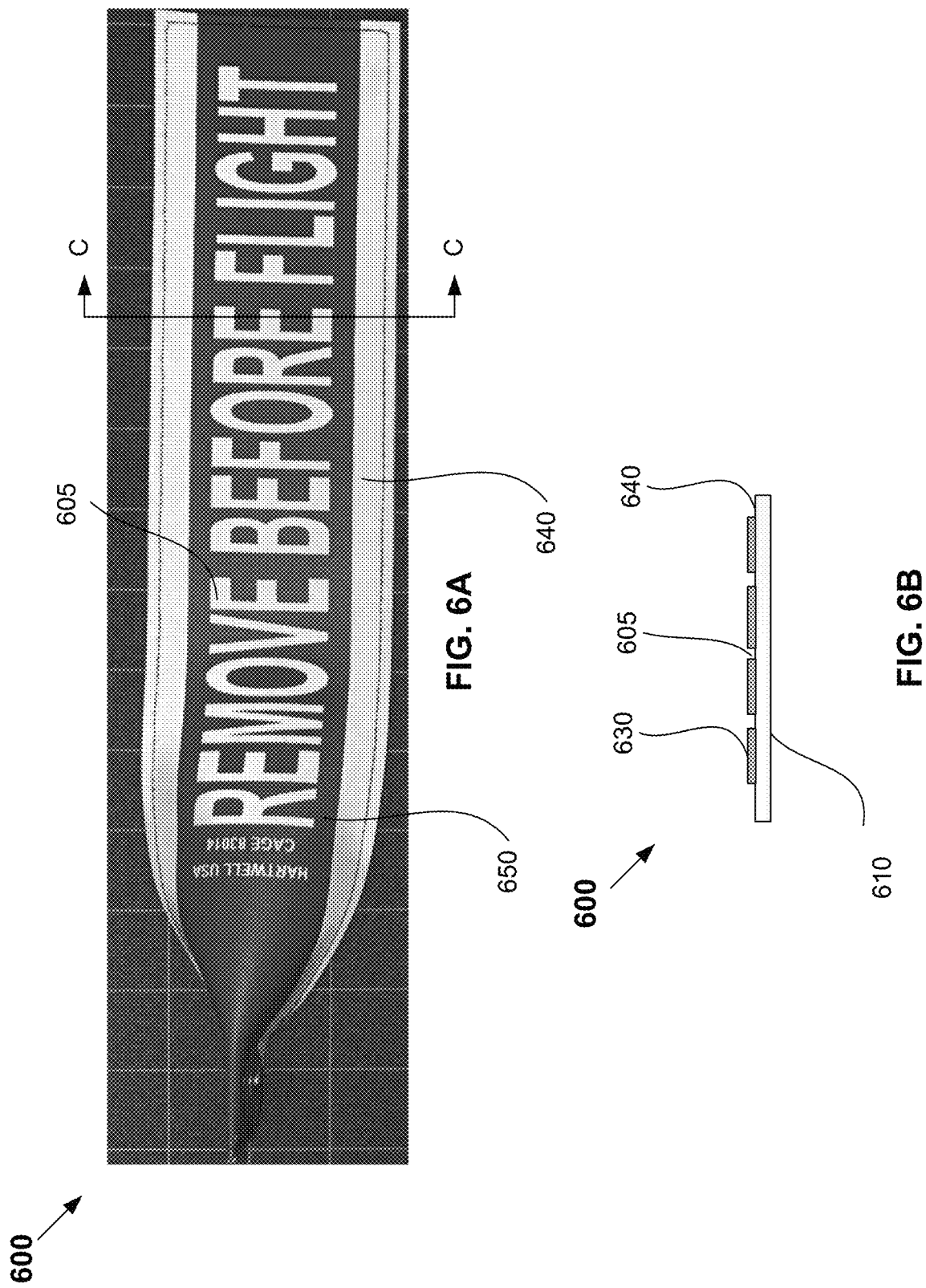
FIG. 6A is a top plan view of a warning tag in the form of a flag having a layer of negative printing of letters on a reflective sheet, in accordance with an embodiment of the present disclosure.
FIG. 6B is a cross-sectional view of the warning tag taken at line C-C of FIG. 6A.
Figure 8:
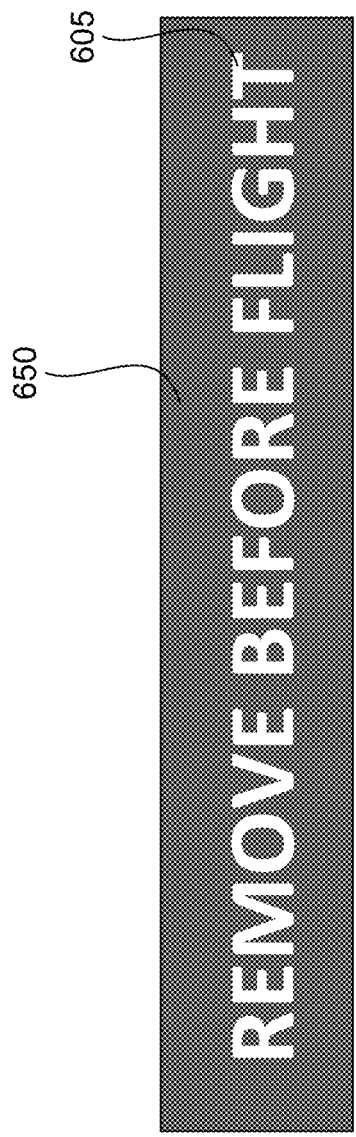
FIG. 8 shows the layer of negative lettering used in the lockout tag of FIGS. 6A and 6B.

FIGS. 6A-6B, depict a warning tag in the form of a flag 600, in accordance with an embodiment of the present disclosure. The warning tag 600 has an elongated substrate layer 610 having a predetermined length and a predetermined width. The substrate layer has a top-side reflective coating 640. The top-side reflective coating 640 is covered with non-reflective ink 630 such that the warning indicia message 605 is left exposed while the surrounding area thereto is covered or coated. This is best shown in FIG. 8, which shows a non-reflective ink coating 650 leaving the warning indicia text 605 exposed.

In one embodiment, the non-reflective ink coating 650 has a length similar to that of the substrate layer 610 and the reflective top-side coating 630, but has a width smaller than the reflective top-side reflective coating 640 which leaves two edge strips of the reflective layer exposed. The warning indicia 605, formed on the top-side coating layer 640, is negatively-formed thus constituting a negative lettering of the warning indicia 605.

Light shining on the flag 600 will reflect on the edge strips and on the warning indicia 605. Accordingly, an observer will both determine the presence of a lockout tag or 'remove before flight' flag and read the text of the warning indicia 605.

In exemplary embodiments, a number of ink formulations may be utilized in wide format inkjet printers, including solvent, UV-curable, aqueous (water-based) and latex inks. Such printers are commercially available from manufacturers such as EFI and AGFA.

Figure 7:
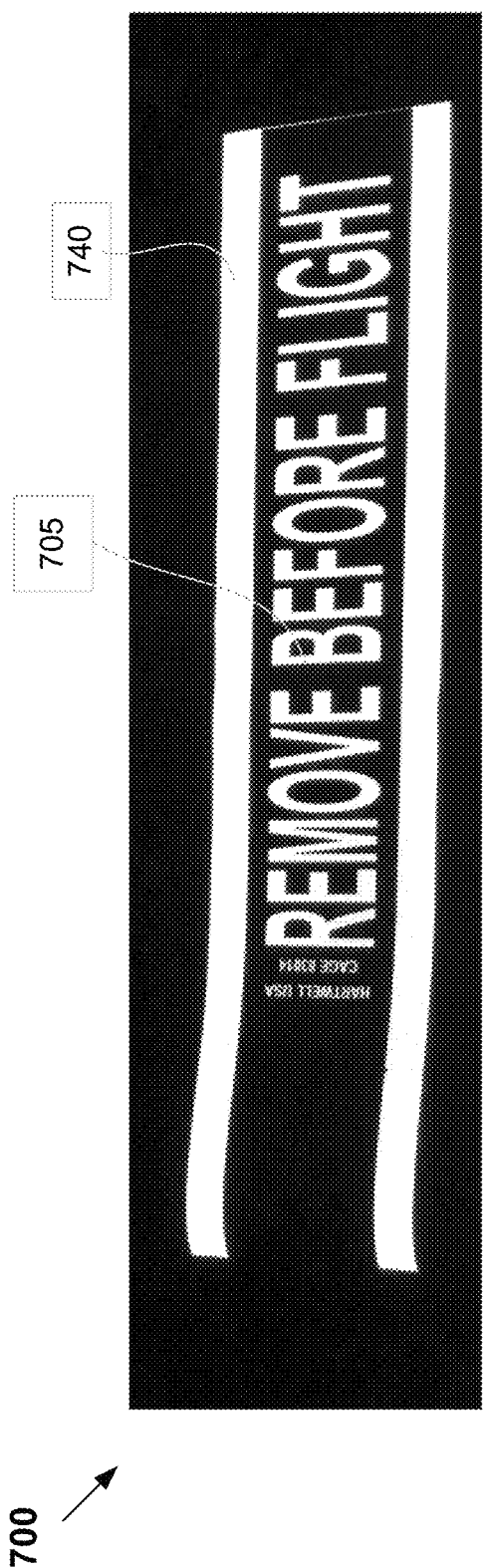
FIG. 7 shows another embodiment of the warning tag of FIG. 6A, showing the reflective negative printed warning tag properties.

FIG. 7 shows a black-and-white image of another embodiment of a flag 700, exemplary of another embodiment of the present invention, under good lighting conditions. The text of the warning indicia 705 can be read by a user in addition to the edge strips 740.

FIG. 8 shows the layer of negative lettering used in the lockout tag of FIG. 6A and FIG. 6B.

Figure 9:
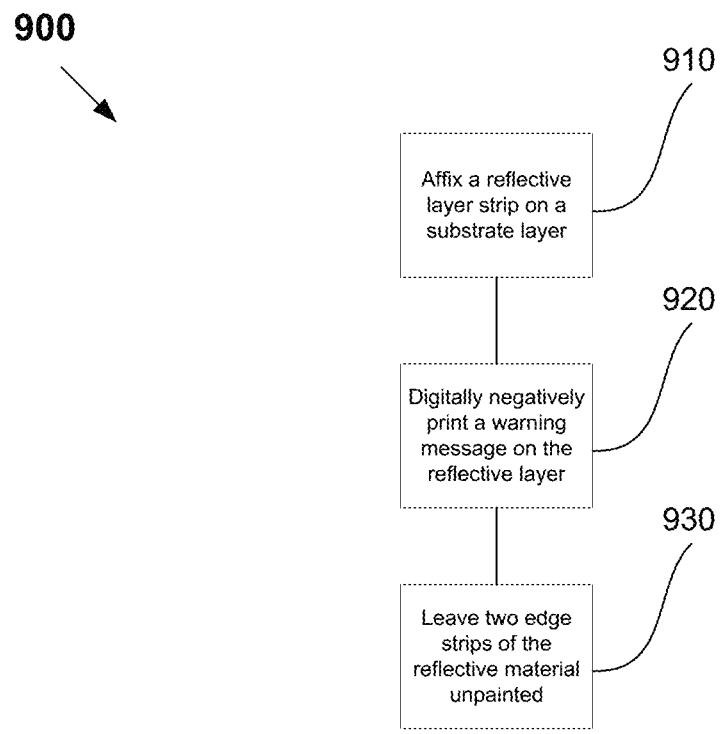
FIG. 9 shows a process diagram for the steps of making the warning tag of FIG. 6A.

FIG. 9 shows a flowchart of an exemplary process 900 for printing the warning message on the warning tag, summarizing the major steps involved. At step 910 a reflective strip is affixed on a substrate layer. At 920, a warning message is negatively printed on the reflective layer.

During negative printing, the reflective strip is covered with non-reflective ink such that the warning indicia message is left exposed or uncovered while the surrounding area thereto is coated or covered. Further, in this embodiment, the negative printing leaves edges of reflective materials uncovered for added reflectivity as specified in step 930.

In alternate embodiments, this process may be used on a glass bead reflective layer or a microprismatic layer.

In at least some embodiments of the present invention, a digital printing process is used with ink that is meant for outdoor use, such as on road signs for the negative printing step.

Some prior art methods simply screen print reflective lettering from inks that are made with a slurry of glass beads and cured in an oven. Examples of screen printing reflective lettering can be seen in the apparel industry. However, these inks used in the prior art are not meant for outdoor use and deteriorate rapidly due to exposure to ultraviolet rays. Glass bead inks are also not abrasion resistant, so they tent to wear off, crack or flake over time.

Advantageous, the ink used in embodiments of the present invention, is meant for outdoor use and thus mitigates the problems wearing off, cracking or flaking.

Other disadvantages with screen printing glass bead inks include the fact that, small part numbers cannot be reliably printed as the screen tends to smear fine details of lettering. In particular, it is difficult to achieve legible printing with a screen printing process for lettering or text that is ¼' or less in height whereas embodiments of the present invention are able to print legible letters that are ¼ inch in height or less. Further, it is also not feasible to digitally print glass bead ink due to the size of the glass beads not being able to go through the print bead.

Other prior art methods involve die cut reflective lettering that is applied to a backing and heat transferred to a fabric sub straight. The drawback of this process is that it is often difficult to achieve a good adhesion that lasts in outdoor conditions.

At least some of the aforementioned shortcomings can be overcome with embodiments of the present invention as described above.

The above-described embodiments are presented by way of example only. Various modifications and alternatives are also contemplated to fit within the scope of the invention as defined by the claims.

The invention claimed is:

1. A warning tag, comprising:
a substrate layer;
a reflective layer laid on top of the substrate layer; and
a non-reflective ink coating disposed directly on the reflective layer, the non-reflective ink coating smaller in size than the reflective layer so as to expose:
a negatively printed message on the reflective layer; and
edge strips consisting of: a first edge strip above the negatively printed message, and a second edge strip below the negatively printed message,
wherein, the message comprises: indicia comprising at least one text character, the indicia partially surrounded by the edge strips for added reflectivity;
wherein the non-reflective ink is selected from the group consisting of: solvent, aqueous and latex inks, dye, paint, stain, pigment, tint, and varnish; and
wherein said at least one text character is legible and smear free at a height of is ¼ inch or less.

2. The warning tag of claim 1, wherein the negatively printed message is printed using a digital printing process utilizing ink that is suitable for outdoor use.

3. The warning tag of claim 2, wherein the digital printing process comprises wide format inkjet technology.

4. The warning tag of claim 1, wherein the reflective layer comprises a glass bead reflective layer.

5. The warning tag of claim 1, wherein the reflective layer comprises a microprismatic layer.

6. The warning tag of claim 1, wherein the first edge strip and second edge strip on the reflective layer are parallel.

7. The warning tag of claim 1, wherein the reflective layer is covered with the non-reflective ink to form the non-reflective ink coating such that the indicia is left exposed while the immediate surrounding area thereto is covered.

8. The warning tag of claim 7, wherein the substrate is rectangular having a predetermined length and a predetermined width, the non-reflective ink coating has a length similar to that of the predetermined length of the substrate layer and the reflective layer, but has a width smaller than the reflective layer.

9. A process of making a warning tag, the process comprising:
affixing a reflective layer on top of a substrate layer;
applying a non-reflective ink coating directly on the reflective layer, the non-reflective ink coating smaller in size than the reflective layer;
negatively printing a message on the reflective layer using the non-reflective ink;
negatively printing a first edge strip on the reflective layer using the non-reflective ink above the message; and
negatively printing a second edge strip on the reflective layer using the non-reflective ink below the message;
wherein the non-reflective ink is selected from the group consisting of: solvent, aqueous and latex inks, dye, paint, stain, pigment, tint, and varnish; and
wherein the first edge strip and the second edge strip provide added reflectivity.

10. The process of claim 9, wherein the first and second edge strips on the reflective layer are parallel.

11. The process of claim 9, wherein the reflective layer comprises a glass bead reflective layer.

12. The process of claim 9, wherein the reflective layer comprises a microprismatic layer.

13. The process of claim 9, wherein said negatively printing said message comprises, covering the reflective layer with non-reflective ink to form the non-reflective ink coating such that a warning indicia message is left exposed while the immediate surrounding area thereto is covered.

14. The process of claim 9, wherein the non-reflective ink coating has a length similar to that of the substrate layer and the reflective layer, but has a width smaller than the reflective layer.

15. The process of claim 9, further comprising providing the substrate layer.

16. The process of claim 9, wherein said negatively printing comprises using a digital printing process utilizing ink that is suitable for outdoor use.

17. The process of claim 9, wherein said message comprises text that is ¼ inch or less in height.

* * * * *